Patented Dec. 2, 1952

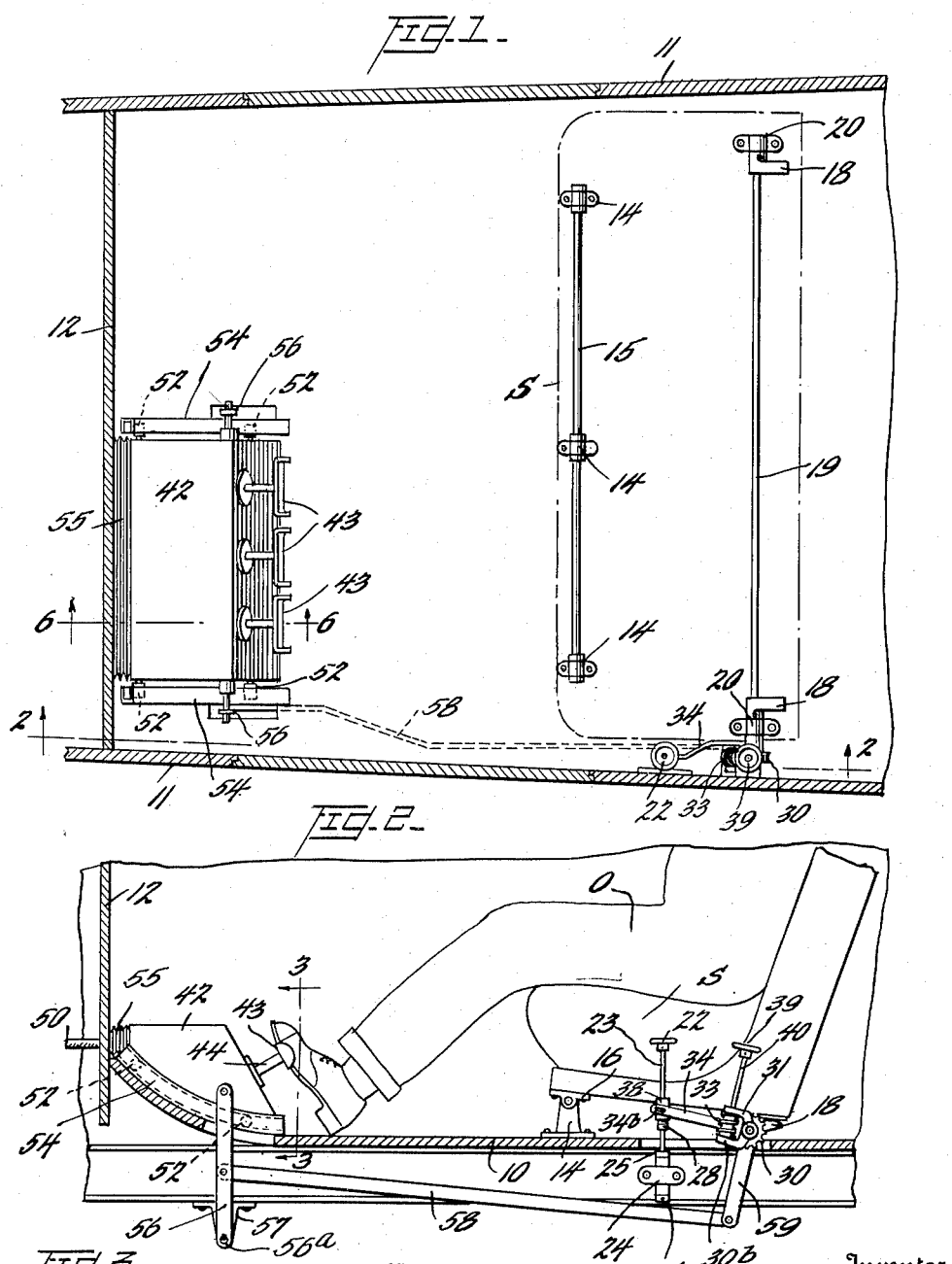

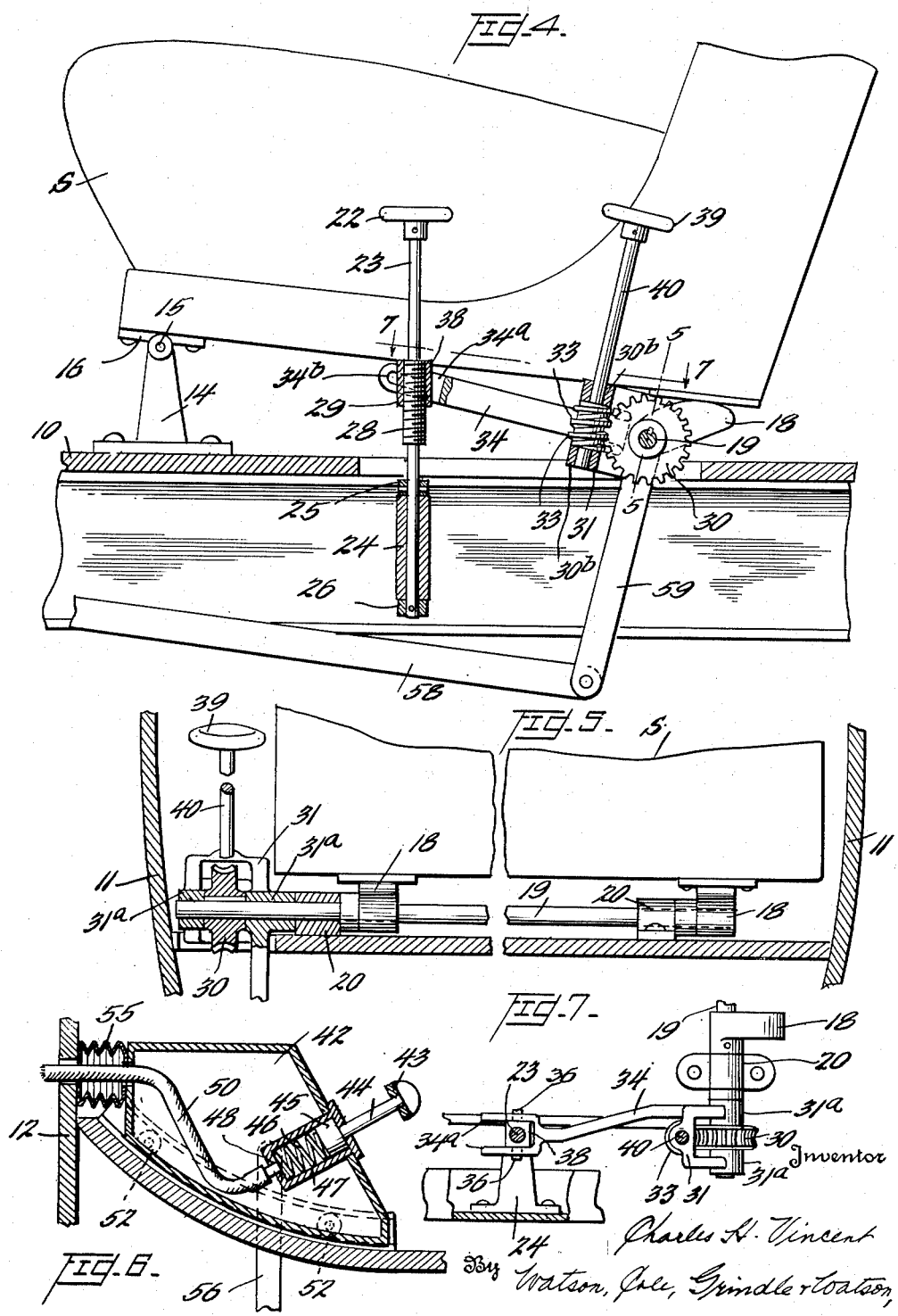

2,620,042

UNITED STATES PATENT OFFICE 2,620,042

MOTOR VEHICLE DRIVER'S SEATING ARRANGEMENT

Charles H. Vincent, Avoca, Mich., assignor to Packard Motor Car Company, Detroit, Mich., a corporation of Michigan Application April 15, 1948, Serial No. 21,189

7 Claims. (Cl. 180—77)

The present invention relates to motor vehicles and particularly to improvements in motor vehicle body constructions, and to the accommodations provided for the operators of such vehicles.

A motor vehicle operator must, while seated, be able to reach and manipulate at least several control members, including the hand operated steering wheel and one or more foot operated members or pedals. These control members he should be able to reach and operate easily in order to be able to control the movements of the vehicle in such manner as to provide maximum safety for himself and others and in order to minimize fatigue when it is necessary for him to drive the vehicle for long periods of time without resting. It is important that the posture of the operator be a natural one in order that safe operation be realized and driving fatigue be minimized, and it is particularly important that the foot pedal or foot pedals which the operator must actuate from time to time, sometimes with great suddenness, should at all times be within the convenient reach of the operator's foot, or feet, when he is sitting naturally upon the seat which is provided.

It is customary to provide motor vehicle bodies with operator's seats which may be adjusted longitudinally of the vehicles in which they are installed, in order to enable a seated operator to shorten or lengthen the distance between the seat and the foot pedals. It is not customary, however, to provide steering wheels of adjustable type and, as is well known, a seat adjustment which enables an operator to conveniently reach the control pedal or pedals may place him in a rather awkward position with respect to the steering wheel. Furthermore, when the operator changes the position of the operator's seat with respect to the pedals, by sliding it forwardly or rearwardly, the direction of the natural line of thrust of his foot against the usual control pedal also changes, whereas the control pedals themselves do not change position and hence may be most easily and conveniently manipulated by the operator only when the operator's seat is in one certain position.

It is the purpose of the present invention to provide a vehicle body having a novel and improved relationship of driver's seat and control instrumentalities whereby an operator, regardless of size or physical peculiarities, may, by making simple adjustments, bring about a desired relationship between the seat upon which he rests and the foot pedal or pedals which he must necessarily manipulate. Preferably the seat is disposed to tilt in a fore and aft vertical plane about a fixed transverse axis and the pedals are mounted upon a pedal support which may be adjusted longitudinally of the vehicle and also tilted or angularly adjusted in a longitudinal vertical plane. A simple form of seat tilting and pedal support moving mechanism is provided, this mechanism including a manually operable element positioned conveniently within the reach of the seated operator and the mechanism being of such character that he can readily adjust the seat and pedal support from time to time in accordance with his desires, the seat and pedal support remaining locked in adjusted position until some move is made to change that position.

The pedal support is preferably mounted for sliding movement along a trackway which is upwardly and forwardly inclined, for instance being arcuate, the arrangement being such that, as the seat is tilted forwardly the pedal support is moved rearwardly and is angularly adjusted somewhat to elevate the pedal slightly and incline its angle of movement more steeply to the horizontal. The pedal support is of novel character and the pedals which are mounted thereon are connected by electrical or flexible mechanical means to the mechanisms or instrumentalities which they are to control, such flexible connections being necessary inasmuch as the pedal support is movable and the clutches, braking mechanisms or the like to be controlled are fixed with respect to the vehicle body. Thus the pedals, instead of being connected by conventional means with the mechanisms to be operated or controlled, may be associated with hydraulic cylinders so that, when depressed, fluid under pressure will be transmitted through a flexible hose to the part to be operated. Alternatively, the pedals may be connected to and actuate valves, or electrical switches, these valves or switches being connected by flexible wire or tubes to parts which are not bodily movable with respect to the vehicle body. One skilled in the art will recognize that the invention may be carried into practice in various ways and that, without departure therefrom, the design and arrangement of the various component elements may be considerably modified. That form of the invention which is illustrated in the accompanying drawings is, therefore, set forth by way of example only.

In the drawings:

Figure 1 is a horizontal section through portion of a vehicle body, looking down upon the pedal support and the means for effecting adjustment of the driver's seat, the driver's seat being indicated in chain lines;

Figure 2 is a section on line 2—2 of Figure 1;

Figure 3 is a section on line 3—3 of Figure 2;

Figure 4 is a longitudinal section through portion of the vehicle body showing, on a larger scale, the end of the operator's seat and the means for effecting adjustment of that seat;

Figure 5 is a section on line 5—5 of Figure 4;

Figure 6 is a section on line 6—6 of Figure 1; and

Figure 7 is a section on line 7—7 of Figure 4.

The vehicle body may vary widely in shape and in details of construction. That which is shown in part is diagrammatically illustrated and comprises a floor board 10, side walls 11 and a transverse partition 12 forming portion of the dash. The operator's seat is generally indicated at S and, in Figure 2 of the drawings, the position of an operator, when in position to manipulate the steering wheel and other controls of the vehicle, is generally indicated at O. The seat S is pivotally supported for rotation about a transverse axis which is just below the forward edge of the seat, three or more brackets or pedestals 14 bolted or otherwise secured to the floor of the vehicle supporting the transversely extending rod 15, and bearing members 16 secured to the undersurface of the frame of the seat having aligned apertures which receive this rod. Other means for supporting the seat for pivotal movement about a transverse axis which lies beneath its forward portion may, of course, be employed.

The seat is supported, adjacent its rear edge, upon two or more cams 18 which are fixed upon the transversely extending shaft 19, this shaft being rotatably supported in bearing or bracket members 20 fixed to the floor of the vehicle. By rotation of rod 19 the seat supporting cams 18 may be manipulated to raise or lower the rear of the seat and thus rock or tilt the seat about the axis of rod 15 located beneath its forward edge. The operator may readily effect this tilting movement by grasping and rotating the conveniently positioned wheel or handle 22 which is located in the space between the end of the seat and the wall of the vehicle.

Handle 22 is fixed upon the upper end of a rotatable spindle or shaft 23 carried in a bearing 24 rigidly mounted upon the vehicle body, collars 25 and 26 pinned to the shaft 23 holding this shaft against vertical movement while permitting it to be rotated freely. The mid-portion of the shaft 23 is of enlarged diameter and is threaded as at 28. The rotatable vertically disposed adjusting shaft 23 is operatively connected to the horizontal shaft 19 this operative connection including a worm wheel 30 keyed on shaft 19, a bracket 31 having spaced sleeve-like portions 31a freely mounted on shaft 19 on opposite sides of the worm wheel, and a worm 33 the teeth of which mesh with those of worm wheel 30, the shaft of worm 33 being rotatably supported in spaced elements 30b of the bracket 31, an arm 34 rigid with bracket 31 extending toward shaft 23 and having a bifurcated end the parallel elements 34a thereof being disposed on opposite sides of the vehicle shaft 23. Each of these elements 34a of arm 34 is slotted, as at 34b, and these slots receive, respectively, pins 36 extending outwardly in opposite directions from a nut 38 which has threaded relation with the threaded portion 28 of shaft 23.

By rotating shaft 23 the nut 38 may be raised or lowered and the angular position of arm 34 may be changed, thus causing angular movement of transverse shaft 19 about its axis, the cams 18 being thus raised or lowered as desired. The motion of arm 34 is, of course, communicated to shaft 19 through the worm and worm wheel and a second operating handle 39 is fixed on the upper end of the worm shaft 40 so that the angularity of shaft 19 and cams 18 with respect to arm 34 may be changed from time to time as desired.

The pedal support is indicated at 42 and comprises any suitable means for supporting one or more pedals, those portions of the pedals which are adapted to be engaged by the foot of the operator being indicated at 43. The details of construction of the pedals support may be varied widely, as will be apparent, but in any event will carry one or more pedals and some means which has the capacity to communicate the movements of the pedal or pedals to the part or parts to be actuated when the pedal is moved and which means is of flexible nature so that any pedal may move with respect to the associated part without interrupting the operative connection between the two. By way of example member 43 may be mounted upon a thrust rod 44 the lower end of which is rigidly attached to a piston 45 which works against a spring 46 within the cylinder 47. A port 48 in the opposite end of the cylinder 47 is in constant communication with a flexible tube 50 which connects the cylinder 47 to a fluid responsive device of conventional nature and which may actuate a brake, clutch or other instrumentality to be controlled.

The support 42 as a whole is provided with supporting rollers 52 which are disposed in the parallel forwardly and upwardly curved grooves or trackways 54 which are fixed to the floor 10 of the vehicle. Bodily movement in a fore and aft direction of the pedal support 42 may, therefore, be readily effected and, when such movement occurs, the pedal support as a whole is rocked or tilted in a fore and aft vertical plane, changing the angularity of the piston rods or plungers 44, these rods becoming more erect as the pedal support moves rearwardly and less erect as the pedal support is moved forwardly. A bellows like flexible tubular connection 55 between the forward end of the pedal support 42 and the rear face of the dash 12 encircles the aperture in the pedal support through which the flexible connections 50 extend and thus confines any fumes emanating from the engine compartment which might otherwise escape.

The means for forwardly and rearwardly adjusting the pedal support 42 is of simple nature, comprising two substantially vertical arms 56 the upper ends of which are connected to the pedal support and the lower ends of which are fixed upon a transverse shaft 56a supported for rotation in brackets 57 rigidly secured to the body. One of the arms 56 is connected by means of a link 58 to an arm 59 rigid with and extending downwardly from the bracket 31 previously described. This connection is such, therefore, that, when handle 22 is rotated to revolve the shaft 23 in one direction, the seat S will be tilted upwardly about the axis of rod 15 and the pedal support 42 will be simultaneously drawn rearwardly toward the seat and, at the same time, rocked in a vertical fore and aft plane so that the members 44 become more vertical and the foot receiving brackets 43 of the pedals are more suitably presented for engagement by the feet of the operator. It is desirable to interconnect the tilting seat and the pedal support in this manner since, if the distance between the seat and pedal support is to be decreased the members 44 should be inclined more steeply to the horizontal to promote the operator's comfort. When the operator so desires the pedal support may be moved forwardly and the members 43 lowered, the seat being at the same time allowed to tilt toward the rear of the car. Thus operators having different physical characteristics may readily adjust the seat and pedals to suit their own individual requirements.

Having thus described the invention, what is claimed as new and desired to be secured by Letters Patent is:

1. A motor vehicle comprising a body, a seat for the operator, a control pedal adapted to be engaged by the foot of an operator positioned on said seat, a support upon which the control pedal is mounted for movement, relatively to the support, upon the application of force by the foot of the vehicle operator, said support being mounted on the body of the vehicle in advance of the operator's seat so as to be movable as an entirety toward and away from said seat, an operating element movably mounted on the body and positioned within reach of an operator on said seat, and means permanently connecting the said support and element whereby the support may be adjusted fore and aft of the vehicle body relatively to the seat and locked against movement in any desired position of adjustment.

2. A motor vehicle comprising a body, a seat for the operator, a control pedal adapted to be engaged by the foot of an operator positioned on said seat, a support upon which the control pedal is mounted for movement, relatively to the support, upon the application of force by the foot of the vehicle operator, said support being mounted on the body of the vehicle in advance of the operator's seat so as to be movable as an entirety toward and away from said seat, and angularly in a fore and aft vertical plane, an operating element movably mounted on the body within reach of an operator positioned on said seat, and mechanism including a mechanical linkage permanently connecting said element and support for adjusting the position of the support and its associated pedal angularly with respect to, and toward and away from, the seat of the operator when said element is actuated, said mechanism being adapted to maintain said support in any position to which it may be adjusted.

3. A motor vehicle comprising a body, a seat for the operator, a control pedal adapted to be engaged by the foot of an operator positioned on said seat, a support upon which the control pedal is mounted for movement relatively to the support upon the application of force by the foot of the operator, means mounting the support upon the vehicle body in advance of the operator's seat for movement as an entirety along an arcuate path extending generally longitudinally of the vehicle, an operating element movably mounted on the body within reach of an operator positioned on said seat, and mechanism including a mechanical linkage permanently connecting said element and support for moving said support with its associated pedal along said arcuate path to vary as desired the distance between the support and seat and to effect angular adjustment of the support.

4. The combination set forth in claim 3 in which said mounting means defines an arcuate path extending forwardly and upwardly so that the pedal support is tilted rearwardly as it is moved away from the seat.

5. In a motor vehicle, in combination, a vehicle body, an operator's seat mounted on said body for pivotal movement about an axis transverse to said body, a pedal support mounted on the body in advance of the operator's seat so as to be movable as an entirety toward and away from said seat, a pedal movably mounted on said support, an operating element within the convenient reach of an operator positioned on said seat, a device engaging the seat at a point remote from the axis about which the seat pivots and which may be actuated to tilt the seat about said axis, and mechanism connecting said operating element to the said device and pedal support which, when actuated by said element, will effect tilting of said seat and movement of the pedal support relatively to the operator's seat.

6. The combination set forth in claim 5 in which said device includes a plurality of cams each of which contacts the undersurface of the seat, a transversely disposed shaft upon which the cams are fixed, and a lever operatively connected to said shaft, the said operating element being in engagement with said lever and adapted to actuate the same and maintain it in any position to which it may be adjusted.

7. The combination set forth in claim 5 in which said device includes a plurality of cams each of which contacts the seat and a transversely disposed rock shaft upon which the cams are mounted, and said mechanism includes a lever connected to the shaft for rocking the same, the connection between lever and shaft including a worm mounted on the lever and a worm wheel fixed on the shaft and meshing with the worm, whereby the lever and shaft may be relatively adjusted about the axis of the shaft, said operating element engaging the lever at a point remote from said worm.

CHARLES H. VINCENT.

REFERENCES CITED

The following references are of record in the file of this patent:

UNITED STATES PATENTS

| Number | Name | Date |
|---|---|---|
| 1,882,315 | Clayton | Oct. 11, 1932 |
| 1,902,094 | Page | Mar. 21, 1933 |

FOREIGN PATENTS

| Number | Country | Date |
|---|---|---|
| 679,679 | Germany | Aug. 10, 1939 |
| 842,220 | France | Feb. 27, 1939 |